United States Patent
Machino

[11] Patent Number: 6,149,044
[45] Date of Patent: Nov. 21, 2000

[54] SUPPORTING MECHANISM FOR PINCH ROLLER UNIT FOR USE IN MAGNETIC RECORDING/REPRODUCING APPARATUS

[75] Inventor: Hiroshi Machino, Tokyo, Japan

[73] Assignee: Mitsubishi Denki Kabushiki Kaisha, Tokyo, Japan

[21] Appl. No.: 09/128,972

[22] Filed: Aug. 4, 1998

[30] Foreign Application Priority Data

Aug. 6, 1997 [JP] Japan .................................. 9-211957

[51] Int. Cl.[7] .................................................. B65H 20/02
[52] U.S. Cl. .................................................... 226/194
[58] Field of Search .................................. 226/194, 190, 226/179, 181, 182, 183, 184, 185, 186, 187; 242/346.2, 354, 615.2; 360/90, 96.4

[56] References Cited

U.S. PATENT DOCUMENTS

| | | | |
|---|---|---|---|
| 3,402,868 | 9/1968 | Hammond | 226/186 |
| 5,373,982 | 12/1994 | Takahashi | 226/194 |
| 5,626,273 | 5/1997 | Fell | 226/194 |

FOREIGN PATENT DOCUMENTS

| | | |
|---|---|---|
| 0423883A2 | 4/1991 | European Pat. Off. . |
| 0576083A2 | 12/1993 | European Pat. Off. . |
| 4320680 C1 | 1/1995 | Germany . |
| 8-297888 | 11/1996 | Japan . |

*Primary Examiner*—John M. Jillions

[57] ABSTRACT

A supporting mechanism of the invention is for supporting a pinch roller for use in a magnetic recording/reproducing apparatus. A pinch roller is rotatably mounted on a fixing shaft that includes two separate parts, a supporting shaft and a hollow shaft. The fine adjustment of the marginal movement height of the pinch roller can be simplified in the thrust direction of the shafts. The shapes of the supporting shaft and the hollow shaft are simple to machine, and the smoothness of cylindrical surface can easily be achieved. The pinch roller is held at a predetermined height with respect to a recording tape. The supporting shaft press-fittingly extends through the hollow shaft. The hollow shaft is adjustably secured to the supporting shaft and is positioned in an axial direction of the supporting shaft so that the height of the pinch roller is adjusted with respect to the recording tape.

19 Claims, 4 Drawing Sheets

SUPPORTING MECHANISM FOR PINCH ROLLER UNIT FOR USE IN MAGNETIC RECORDING/REPRODUCING APPARATUS

BACKGROUND OF THE INVENTION

1. Field of the Invention

The present invention relates to a supporting mechanism for use with a pinch roller unit which causes a magnetic tape, used in a magnetic recording/reproducing apparatus or the like, to be in pressure contact with a capstan shaft.

2. Description of Related Art

FIG. 2 is a top view of a magnetic recording/reproducing apparatus. FIG. 6 is a cross-sectional view of a supporting mechanism for a conventional pinch roller unit.

Referring to FIGS. 2 and 6, a cassette 60 houses the tape 6 therein with a magnetic tape 6 wound on reels. A guide roller 12 draws the magnetic tape 6 out of the cassette 60 and wraps the magnetic tape 6 round a rotating drum 10. The drum 10 is provided with magnetic heads which record the video signal and audio signal on the magnetic tap or reproduce the signals from the tape.

A pinch roller unit 20 presses the magnetic tape 6 against the capstan shaft 16 so that the magnetic tape 6 travels at a constant speed. A tape guide mechanism 9 guides the travel of a magnetic tape 6. The magnetic tape 6 runs between the capstan shaft 16 and the pinch roller 20 and passes an A/C head (audio control head) 15 which reads the audio signal and control signals recorded on the magnetic tape 6.

Then, the magnetic tape 6 passes an erase head 13 and is further guided by a post pin 14 before being taken up into the cassette 60. The erase head 13 erases the signals recorded on the magnetic tape 6. The post pin 14 defines an angle at which the magnetic tape 6 is wrapped round a back tension mechanism 11. The back tension mechanism 11 controls a tension applied to the magnetic tape 6. All of the aforementioned structural elements are carried on a chassis 1.

FIG. 6 shows one 20 of known pinch roller assembly 20 of the aforementioned type. Referring to FIG. 6, the pinch roller assembly 20 includes a pinch roller 21, fixing shaft 25 on which the pinch roller 21 is rotatably mounted, and a pivot arm 26 that holds the fixing shaft 25 so that the fixing shaft vertically rises from pivotal arm 26. The pinch roller 21 includes a rubber roller 21a, core metal shaft 21b, ball bearing 22, and bushing 21c. The rubber roller 21a presses the magnetic tape 6 against the capstan shaft 16, thereby allowing the magnetic tape to travel at a constant speed. The core metal shaft 21b is a hollow cylinder and has a stepped portion. The rubber roller 21a fits over the core metal shaft 21b for secure engagement. The ball bearing 22 inserted into the core metal shaft 21b and abuts the stepped portion. The bushing 21c serves as a stopper that prevents pull-out of the ball bearing 22. A cap 23 is mounted on an upper portion of the support shaft 25b to restrict the movement of the pinch roller 21 in the thrust direction.

The fixing shaft 25 is formed of, for example, stainless steel (SUS) in one-piece construction and includes a flange shaft 25a and a supporting shaft 25b. The flange shaft 25a supports the pinch roller 21 at a predetermined height with respect to the magnetic tape 6. The supporting shaft 25b supports the ball bearing 22 thereon.

The one-piece construction of the flange shaft 25a and supporting shaft 25b has a disadvantage that fine adjustment of the marginal movement in the thrust direction and height of the pinch roller 21 cannot be made with respect to the magnetic tape 6.

The shape of the boundary between the flange shaft 25a and support shaft 25b is complex and is difficult to be machined. Moreover, the support shaft 25b is difficult to machine for sufficient smoothness of its cylindrical surface.

SUMMARY OF THE INVENTION

The present invention was made to solve the aforementioned drawbacks of the conventional pinch roller unit.

An object of the invention is to provide a pinch roller unit where the fixing shaft includes two separate parts, i.e., a supporting shaft and a hollow shaft, so that the fine adjustment of the marginal movement in thrust direction and height can be simplified, the shapes are simple to machine, and surface accuracy can easily be achieved.

A supporting mechanism of the invention is for supporting a pinch roller for use in a magnetic recording/reproducing apparatus. The pinch roller is held at a predetermined height with respect to a recording tape. The supporting mechanism includes a supporting shaft and a hollow shaft. The supporting shaft rotatably supports the pinch roller. The supporting shaft press-fittingly extends through the hollow shaft. The hollow shaft is adjustably secured to the supporting shaft and is positioned in an axial direction of the supporting shaft so that the height of the pinch roller is adjusted with respect to the recording tape.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not necessarly brut the scope of the present invention, and wherein.

DETAILED DESCRIPTION OF THE INVENTION

Figure 1:
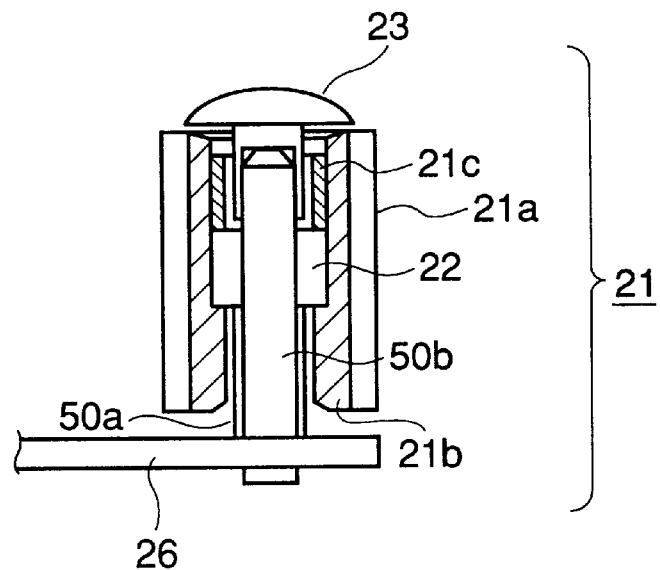
FIG. 1 is a cross-sectional view of a pinch roller unit according to an embodiment of the invention.

The invention will be described in detail with reference to the accompanying drawings. Like elements have been given like reference numerals throughout the drawings. Embodiment FIG. 1 is a cross-sectional view of a pinch roller unit according to the invention. The pinch roller unit 21 differs from the conventional pinch roller unit in that a fixing shaft 50 is of different construction.

The construction of the fixing shaft 50 will be described.

Referring to FIG. 1, the pinch roller 21 includes a rubber roller 21a, a core metal shaft 21b, a ball bearing 22, and a stopper (bushing) 21c. The rubber roller 21a presses the magnetic tape 6 against the capstan shaft 16, thereby allowing the magnetic tape 6 to travel at a constant speed. The core metal shaft 21b is a hollow cylinder with a stepped portion formed in the inner surface thereof and has the rubber roller 21a securely fitted thereover. The ball bearing 22 is inserted into the core metal shaft 21b and abuts the stepped portion. The stopper 21c prevents pull-out of the ball bearing 22.

The fixing shaft 50 includes a supporting shaft 50b and a hollow shaft 50a. The supporting shaft 50b is press-fitted into the hollow shaft 50a and the supporting shaft 50b receives the ball bearing 22 thereon. The hollow shaft 50a may be a hollow cylinder formed of a metal (e.g., copper) softer than a metal material of the supporting shaft 50b or may be a bushing molded from a thermal plastic material. The material of the hollow shaft 50a softer than the supporting shaft 50b facilitates the insertion of the supporting shaft 50b into the hollow shaft 50a. The supporting shaft 50b serves to hold the pinch roller 20 at a predetermined height with respect to the magnetic tape 6. The pivotal arm 26 holds the supporting shaft 50b so that the fixing shaft 50 vertically rises from pivotal arm 26.

Figure 3:
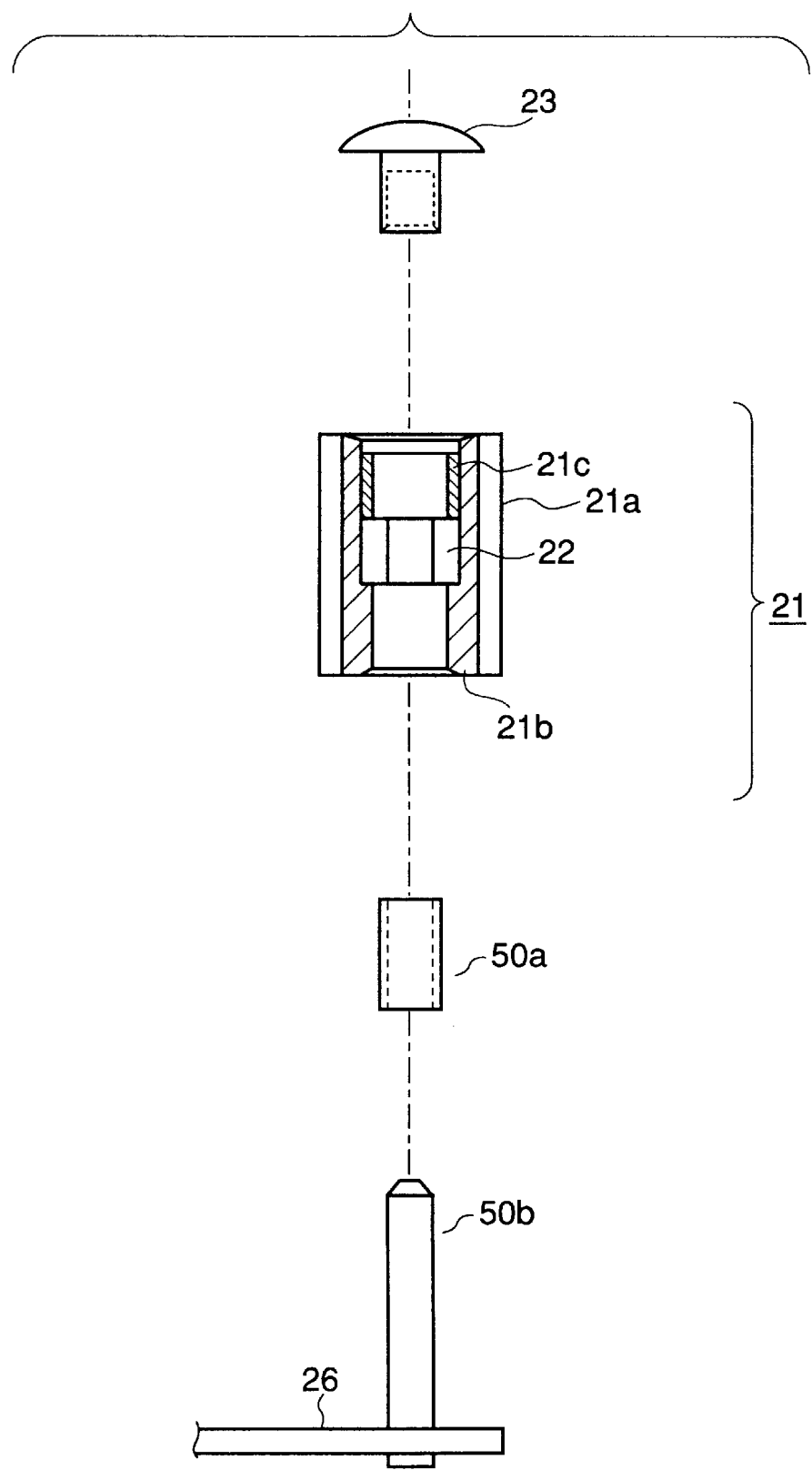
FIG. 3 is a cross-sectional view of a supporting mechanism for a pinch roller assembly in accordance with the invention.

FIG. 3 is an exploded side view of the pinch roller unit 20 of the invention. The assembly operation of the fixing shaft 50 and pinch roller 21 of the aforementioned construction will be described with reference to FIG. 3.

Figure 4:
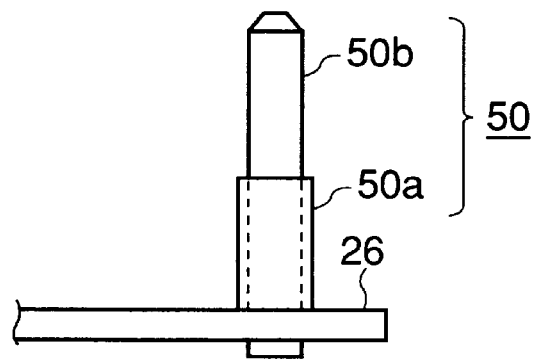
FIG. 4 shows the hollow shaft 50a fitted over the supporting shaft 50b.

The supporting shaft 50b is first fixed by, for example, high spin caulking to the arm 26 such that the supporting shaft 50b rises vertically from the arm 26. Then, the hollow shaft 50a is press-fitted to the supporting shaft 50b as shown in FIG. 4, thereby completing the assembly of the fixing shaft 50. The supporting shaft 50b may be press-fitted by, for example, high spin caulking into the hollow shaft 50a before vertically fixing the supporting shaft 50b to the arm 26. Then, the pinch roller 21 is assembled onto the supporting shaft 50b of the fixing shaft 50. Finally, the cap 23 is fitted to the top portion of the supporting shaft 50b, thereby completing the pinch roller unit 20.

Figure 2:
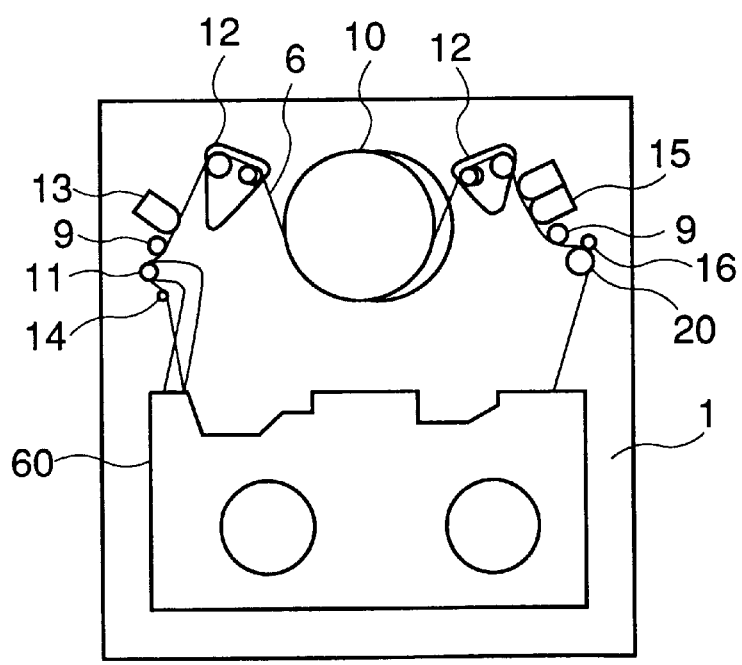
FIG. 2 is a top view of a magnetic recording/reproducing apparatus.

The operation of the fixing shaft 50 will be described with reference to FIG. 2. The tape guide rollers 12 draw the magnetic tape 6 from the cassette 60 in which the magnetic tape 6 is wound on reels. The magnetic tape 6 is wrapped around the rotating drum 10. The magnetic tape 6 runs through the post pin 14, back tension mechanism 11, tape guide mechanism 9, erase head 13, and A/C head 15. The pinch roller 20 presses the magnetic tape 6 against the capstan shaft 16 so that the magnetic tape 6 is supplied from a supply reel, runs at a constant speed, and is finally taken up by a take-up reel, not shown.

Figure 5:
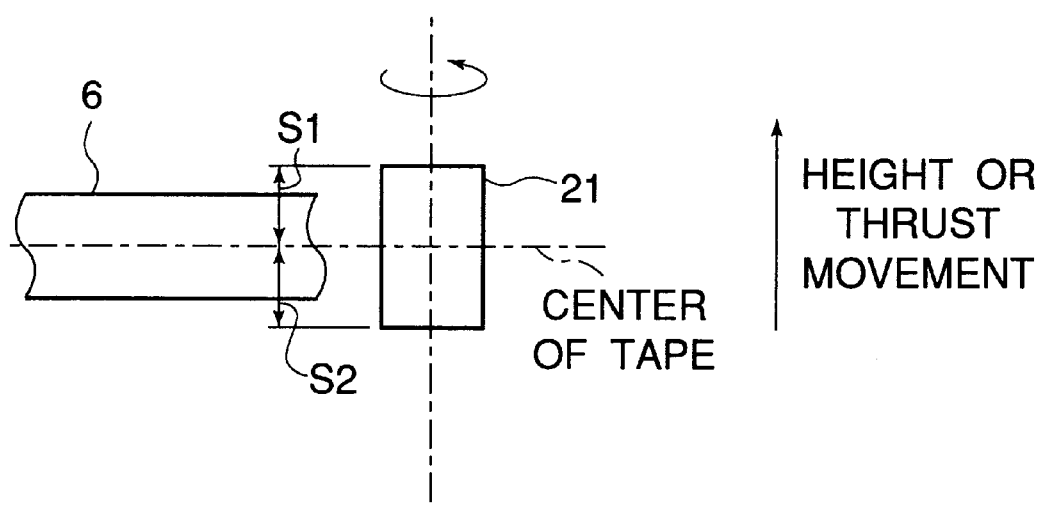
FIG. 5 shows the height of the pinch roller 21 with respect to the magnetic tape.
Figure 6:
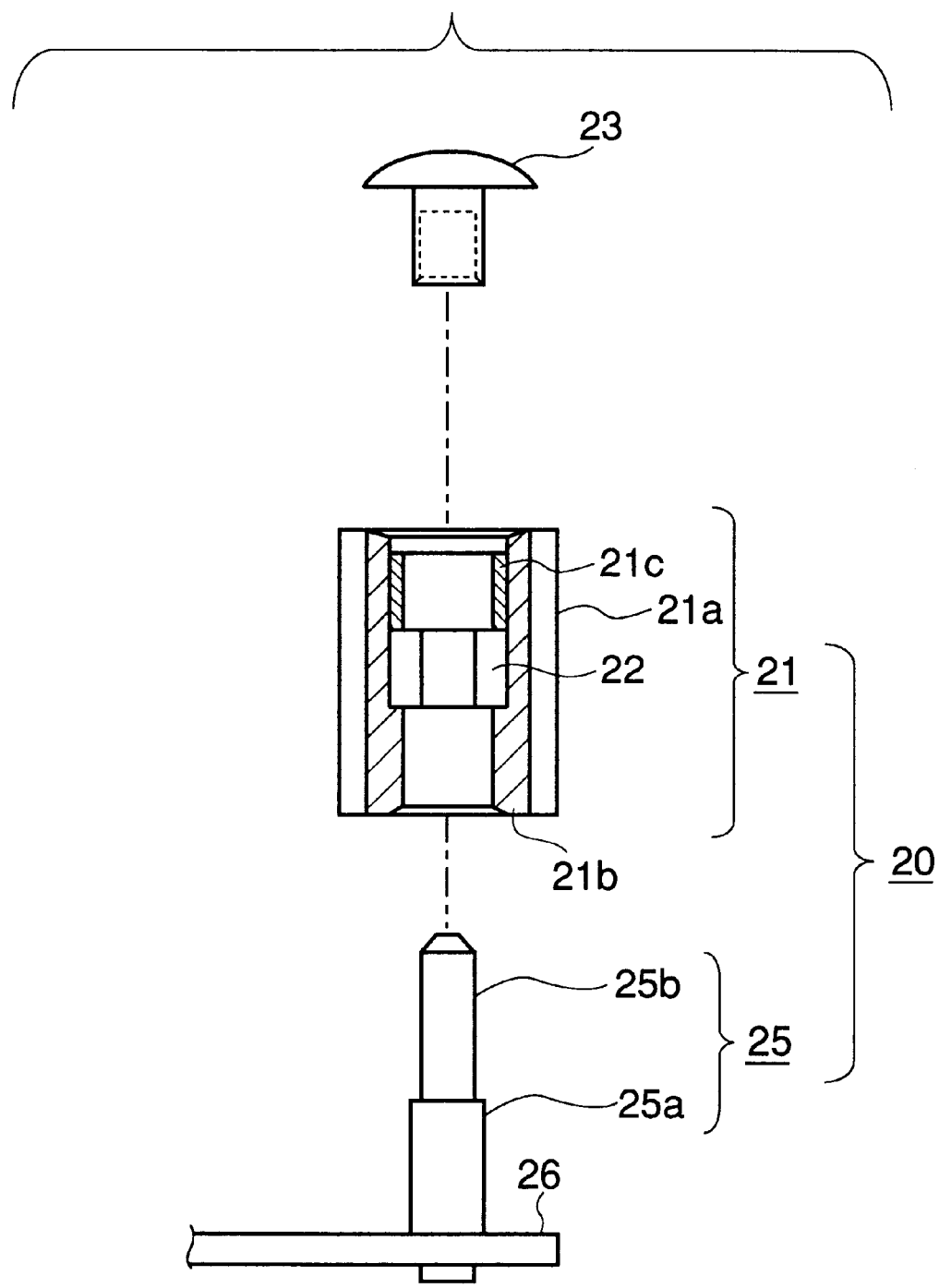
FIG. 6 is a cross-sectional view of a supporting mechanism for a conventional pinch roller unit.

As mentioned above, the pinch roller 20 includes the fixing shaft 50 of two-piece construction including the hollow shaft 50a and supporting shaft 50b. The two-piece construction facilitates fine adjustments of the height and marginal thrust movement of the pinch roller 21 relative to the magnetic tape 6. The adjustment can be carried out during the manufacture of the magnetic recording/ reproducing apparatus, for example, when the traveling condition of tape is checked. As shown in FIG. 5, when the height of the pinch roller 21 has been adjusted properly with respect to the magnetic tape, the margin S1 and S2 are preferably substantially the same.

The hollow shaft 50a and supporting shaft 50b are of simple cylindrical shapes. Such simple shapes of the hollow shaft 50a and supporting shaft 50b makes them easy to machine and lends itself to achieving a smooth cylindrical surface of the shafts 50a and 50b.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A supporting mechanism for a pinch roller for use in a magnetic recording/reproducing apparatus, the supporting mechanism comprising:

a support;

a supporting shaft cantilevered from the support and rotatably supporting the pinch roller; and a hollow shaft for coaxially accepting the supporting shaft, said hollow shaft being adjustably secured to said supporting shaft in a press-fit manner at an axial position with respect to said supporting shaft so that a height of the pinch roller is aligned with respect to a recording tape, the hollow shaft located between the support and the pinch roller where the hollow shaft is adjustable to be spaced apart from the support.

2. The supporting mechanism according to claim 1, wherein said hollow shaft is molded from a thermoplastic material.

3. The supporting mechanism according to claim 1, wherein said hollow shaft is made of a softer metal material than said supporting shaft.

4. The supporting mechanism of claim 1 wherein the support comprises a pivot arm for supporting the supporting shaft, the hollow shaft engaging the supporting shaft such that an axial clearance space exists between the pivot arm and an end of the hollow shaft.

5. The supporting mechanism of claim 1 further comprising a cap adjoining a top portion of the supporting shaft.

6. The supporting mechanism of claim 1 further comprising:

a metal sleeve;

a bearing rotatably cooperating with the supporting shaft and affixed within the metal sleeve.

7. The supporting mechanism of claim 6 further comprising:

a retaining bushing for retaining the bearing relative to the metal sleeve.

8. The supporting mechanism of claim 6 further comprising a rubber roller overlying the metal sleeve.

9. A roller assembly for a magnetic tape, the roller assembly comprising:

a support;

a supporting shaft cantilevered from the support;

a hollow shaft having a generally cylindrical interior for engaging the supporting shaft in a press-fit manner at an adjustable axial position with respect to the supporting shaft;

a roller including an internal metallic sleeve and an external elastomeric layer overlying the internal metallic sleeve;

a bearing affixed to the internal metallic sleeve and rotatable with respect to the supporting shaft the hollow shaft located between the support and the roller where the hollow shaft is adjustable to be spaced apart from the pinch roller.

10. The roller assembly for a magnetic tape according to claim 9 wherein the support comprises a pivot arm for supporting the supporting shaft, the hollow shaft engaging the supporting shaft such that an axial clearance space exists between the pivot arm and an end of the hollow shaft.

11. The roller assembly for a magnetic tape according to claim 9 wherein an axial position of the elastomeric layer of the roller is determined by the adjustable axial position.

12. The roller assembly for a magnetic tape according to claim 9 wherein the bearing rests upon one end of the hollow shaft to determine an axial position of the elastomeric layer.

13. The roller assembly for a magnetic tape according to claim 9 further comprising a magnetic tape associated with the roller; and wherein the height position of the elastomeric layer of the roller is approximately centered with respect to the magnetic tape.

14. The roller assembly for a magnetic tape according to claim 13 wherein the magnetic tape has a width that is less than a height of the elastomeric layer such that an upper margin approximately equals a lower margin for height movement of the magnetic tape.

15. The roller assembly for a magnetic tape according to claim 9 wherein a retaining bushing is urged against the bearing to retain the bearing.

16. The roller assembly for a magnetic tape according to claim 9 wherein the elastomeric layer comprises a generally cylindrical rubber member.

17. The roller assembly for a magnetic tape according to claim 9 wherein the hollow shaft comprises a generally hollow cylinder formed of a first metal softer than a second metal of the supporting shaft.

18. The roller assembly for a magnetic tape according to claim 9 wherein the hollow shaft is composed of copper.

19. The roller assembly for a magnetic tape according to claim 9 wherein the hollow shaft is molded from a thermoplastic material.

* * * * *